United States Patent [19]

Bell, Jr. et al.

[11] 4,254,320

[45] Mar. 3, 1981

[54] POWER OUTPUT MODULE FOR ELECTRICAL DISCHARGE MACHINING POWER SUPPLY CIRCUIT

[75] Inventors: Oliver A. Bell, Jr., Statesville; Randall C. Gilleland, Troutman; Davey J. Chance, Concord, all of N.C.

[73] Assignee: Colt Industries Operating Corp., New York, N.Y.

[21] Appl. No.: 26,048

[22] Filed: Apr. 2, 1979

[51] Int. Cl.³ .............................................. B23P 1/02
[52] U.S. Cl. ................................ 219/69 C; 219/69 P
[58] Field of Search ................. 219/69 P, 69 C, 69 S, 219/69 R

[56] References Cited

U.S. PATENT DOCUMENTS

| 3,277,337 | 10/1966 | Webb | 219/69 P |
| 3,538,291 | 11/1970 | Smith | 219/69 C |
| 3,851,134 | 11/1974 | Takarada | 219/69 C |
| 3,879,596 | 4/1975 | Verner | 219/69 P |
| 3,987,271 | 10/1976 | Bell, Jr. et al. | 219/69 C |

Primary Examiner—C. C. Shaw
Attorney, Agent, or Firm—Harry R. Dumont

[57] ABSTRACT

A power supply circuit including a multivibrator and a power output module. Drive signals are provided at low power level and an FET stage is used to provide a high wattage output to operate the power output module. The power output module provides machining power pulses to the gap through a plurality of series resistors so that peak current can be regulated in the module itself.

5 Claims, 1 Drawing Figure

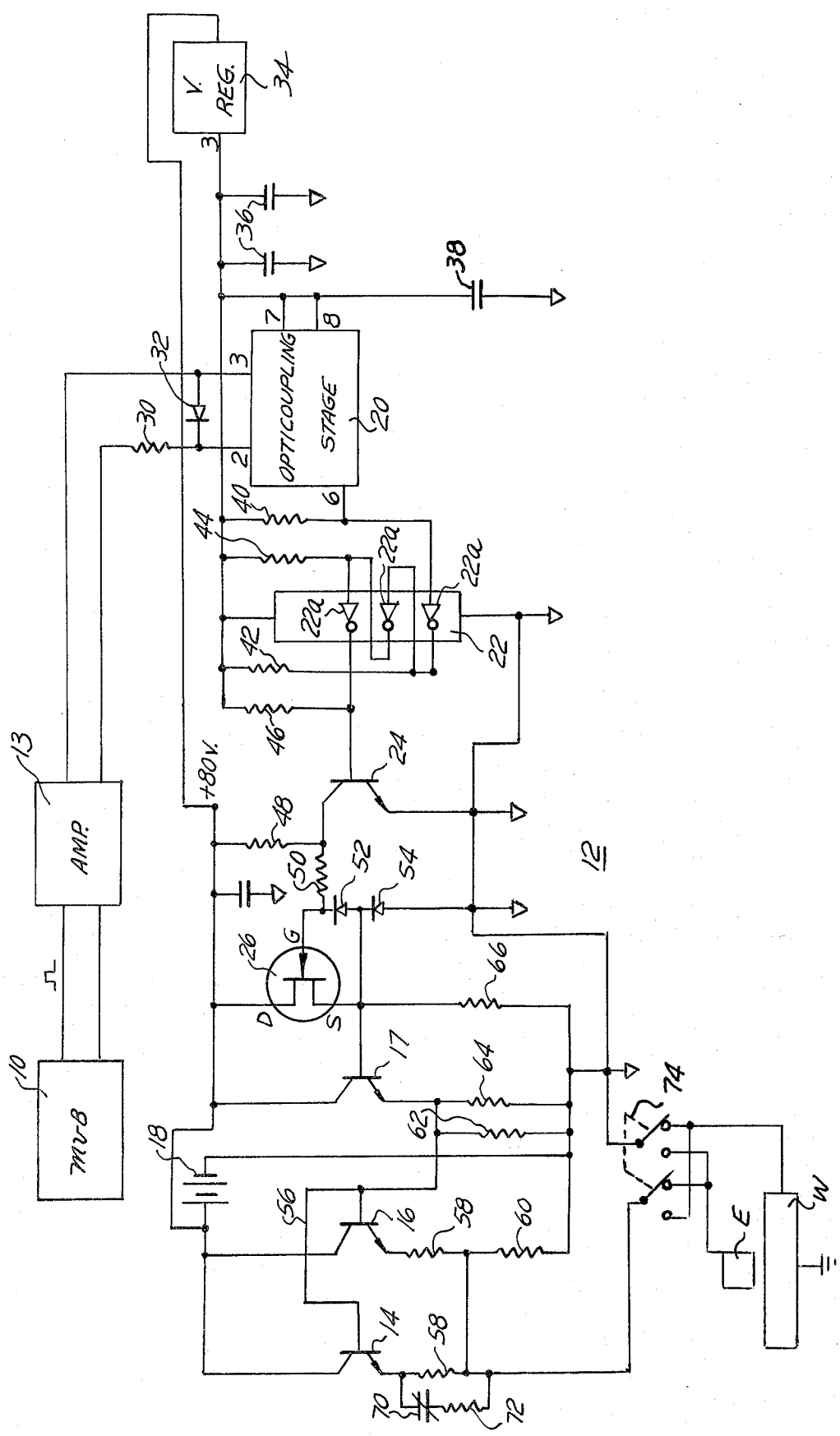

POWER OUTPUT MODULE FOR ELECTRICAL DISCHARGE MACHINING POWER SUPPLY CIRCUIT

BACKGROUND OF THE INVENTION

The field to which our invention relates is that known as Electrical Discharge Machining, hereinafter sometimes referred to as "EDM", in which material is removed from an electrically conductive workpiece by the erosive action of electrical gap discharges between one or more electrodes and the workpiece. A servo feed system is employed to provide relative movement and thus to maintain an optimum gap spacing between electrode and workpiece as material is progressively removed from the workpiece. A dielectric coolant fluid is circulated and recirculated, generally under pressure, through the gap throughout the machining operation. For most reliable and dependable results, an independent pulse generator is utilized to provide machining power pulses of precisely controlled frequency and on-off times. One type of pulse generator suitable for use is shown and described in Oliver A. Bell, Jr., U.S. Pat. No. 3,809,847, issued on May 7, 1974 for "Method and Apparatus for Electrical Discharge Machining".

Included in the power output module are a DC power source, a plurality of electronic output switches and additional stages for taking the triggering pulses from the pulse generator, amplifying and shaping them and finally using them to drive the output electronic switches. The electronic switches shown in the exemplary embodiment are transistors. By "electronic switch" I mean any electronic control device having a plurality of electrodes comprising at least two principal or power conducting electrodes acting to control current flow in the power circuit, the conductivity of the circuit being controlled by a control electrode in the switch whereby the conductivity of the power circuit is controlled statically or electrically without the movement of any mechanical elements within the switch. Included within this definition, by way of illustration but not limitation, are vacuum tubes, transistors, semiconductor control rectifiers, and similar devices.

SUMMARY OF THE INVENTION

The present invention thus relates to a transistorized power supply and to an improved type power output module for providing electrical discharge machining pulses to the machining gap. The power output module itself is opti-coupled to provide electrical isolation to the module with respect to the remainder of the circuitry and the machining gap. The only gap connection that is required is made through the work leads so that the module may be coupled for either plus or minus output with respect to the gap. Included in the power module is a field effect transistor stage sometimes hereinafter referred to as an FET stage for providing a high impedance to the drive circuit. All of the drive triggering signals are provided at very low power levels in the order of milli-watts, while the FET itself provides from its source a high voltage output. Thus it is possible by the use of the FET device to go to approximately 80 volts at the gate and from zero to 70 volts at the source while the current of the signals required to drive the FET is exceedingly small.

BRIEF DESCRIPTION OF THE DRAWINGS

The present invention will now be described in detail in the accompanying specification and drawing in which like reference numerals are used to refer to like parts. The drawing is of a combined block diagrammatic and schematic type.

DETAILED DESCRIPTION OF THE PREFERRED EMBODIMENT

Reference is now made to the drawing for its showing of a basic EDM power supply that includes an independent pulse generator such as multivibrator 10. The multivibrator 10 provides triggering pulses through an intermediate amplifier stage 13. The triggering pulses are used to trigger into machining operation a power output module 12. The standard power module 12 includes an amplifier transistor 17 and plurality of output switches here embodied as NPN transistors 14 and 16. A main DC machining power source 18 is included as shown. The machining gap itself includes an electrode E and a workpiece W. The DC power source 18 is typically of the order of 70 to 80 volts.

Also included to provide an input to the output module 12 are an opti-coupling stage 20 and an inverter 22. The opti-coupling stage 20 may be, by way of example, the model HCPL-2601 opti-coupler currently manufactured and sold by Hewlett-Packard Corporation of 640 Page Mill Road, Palo Alto, California 94304. Next following the opti-coupling stage 20 is an inverter 22. Included in this stage are several inverters tied in parallel through their outputs. The next stage is an amplifier transistor stage 24 which is used to provide a suitable triggering pulse to the gate G of an FET transistor 26. The FET is a high input impedance device.

The operation of the circuit will now be described with reference to the receiving of input triggering pulses from the multivibrator 10 and amplifier 13 at pins 2 and 3 of the opti-coupling stage 20. This input is received through the network including a resistor 30 and a diode 32. The opti-coupling stage 20 further has associated with it a voltage regulator 34 and a pair of capacitors 26. A further capacitor 38 is connected between pins 7 and 8 of the opti-coupling stage 20 and ground potential. The output of the opti-coupling stage 20 is taken from its pin 6. A further resistor 40 is connected to pin 6 as shown.

The next following inverter stage 22 includes several separate inverters 22a tied in parallel with their outputs pulled to a 5 volt level through a resistor 42. The output of the inverter stage 22 at pin 10 is direct coupled to the base of the next following transistor 24. A further resistor 44 is connected between pin 10 of uppermost inverter 22a and a reference voltage source. The base of the transistor 24 is normally biased positive for turn-on through a resistor 46. The output from the inverter 22 is thus used to provide turn-off of the transistor 24. The output of the transistor 24 at its collector is pulled to a voltage level of 80 volts through a resistor 48. The square wave output at the collector of the transistor 24 is then applied to a series resistor 50 to the gate G of the FET 26. Diodes 52 and 54 are included in the circuit as clamps to protect the gate of the FET 26. The drain D of the FET 26 is further connected to the 80 volt terminal. The source S of the FET 26 is coupled to the base of the next following transistor 17. The source S of the FET 26 operates as a source follower and provides a very high impedance to the drive circuit in front of it.

The source S operates to drive the base of the transistor 17 which in turn is connected in an emitter follower configuration. Its emitter output then drives the base buss 56. The output transistors 14 and 16 each have their bases connected to base buss 56 for turn-on and turn-off. The resultant machining power pulses to the gap are passed through series resistor 58 as shown. A relay operated contact 70 and a resistor 72 are connected in the gap circuit as shown. Subject to the selective actuation and closure of the contact 70, selective adjustment of the peak current level of the output of module 12 may be made.

Switch 74 provides changeover between standard gap polarity with electrode negative and workpiece positive and reverse gap polarity with electrode positive and workpiece negative. With the movable contacts of the switch 74 in their righthand position as shown, the polarity is reverse.

The basic function of the voltage regulator 34 is to take a voltage and regulate it down to a level suitable to operate opti-coupling stage 20 and to a level to operate the inverter stage 42. Additional resistors 60, 62, 64 and 66 are connected between different points in the circuit as shown and ground. It will thus be seen that we have provided by our invention an improved power output module for use in an EDM circuit. The module requires only low wattage drive input signals and provides a high wattage output. The module is further of the opti-coupling type and is electrically isolated from the drive circuitry.

We claim:

1. An output power module for an electrical discharge machining power supply including a pulse generator having a triggering pulse output, comprising:
   a power source;
   a plurality of electronic output switches having their principal electrodes operatively connected between said source and gap for providing machining power pulses thereto;
   an intermediate FET stage for turning the output electronic switches on and off; and
   an opti-coupling stage connected intermediate the output of the pulse generator and the FET stage, said FET stage operable as a high input impedance device and having its drain connected to said power source and operable to receive relatively low wattage power pulses on its gate and to convert them to high wattage pulses on its source for operating said output electronic switches.

2. The combination as set forth in claim 1 wherein said pulse generator comprises a multivibrator of the digital type.

3. The combination as set forth in claim 1 wherein said opticoupling stage comprises an opticoupler of the integrated circuit type.

4. The combination as set forth in claim 1 wherein said electronic output switches comprise a plurality of NPN transistors having their bases connected to a common base buss for triggering them on and off and wherein a further amplifier transistor is connected intermediate the output of said FET at its source and said base buss.

5. An output power module for an EDM machining power supply including a pulse generator having a triggering pulse output, comprising:
   a relatively large magnitude power source;
   at least one output transistor having its principal electrodes operatively connected between said source and the gap for providing machining power pulses thereto;
   an intermediate FET stage for turning the output transistor on and off; and
   an opti-coupling stage connected between the output of said pulse generator and the FET stage, said FET stage having its drain connected to said DC power source terminal, said field effect transistor of said stage operable to receive on its gate relatively low wattage drive signals of the order of milli watts and to convert them to high wattage pulses on its source for operating said output transistor.

* * * * *